(12) United States Patent
Deferme

(10) Patent No.: US 7,097,016 B2
(45) Date of Patent: Aug. 29, 2006

(54) FULCRUM BLOW OFF VALVE FOR USE IN A SHOCK ABSORBER

(75) Inventor: Stefan Deferme, Heusden-Zolder (BE)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 27 days.

(21) Appl. No.: 10/655,663

(22) Filed: Sep. 5, 2003

(65) Prior Publication Data
US 2005/0051395 A1 Mar. 10, 2005

(51) Int. Cl.
*F16F 9/34* (2006.01)

(52) U.S. Cl. .............................. 188/322.15; 188/282.5; 188/282.8

(58) Field of Classification Search ................ 188/280, 188/282.5, 282.6, 282.8, 282.9, 322.13, 322.15
See application file for complete search history.

(56) References Cited

U.S. PATENT DOCUMENTS

| | | | |
|---|---|---|---|
| 2,828,836 A | 4/1958 | Kamman | |
| 3,470,986 A * | 10/1969 | Whisler, Jr. | 188/269 |
| 4,203,507 A * | 5/1980 | Tomita et al. | 188/317 |
| 4,401,196 A | 8/1983 | Grundei | |
| 4,460,074 A | 7/1984 | Muller et al. | |
| 4,624,347 A * | 11/1986 | Mourray | 188/322.15 |
| 4,653,617 A | 3/1987 | Casimir et al. | |
| 4,721,130 A | 1/1988 | Hayashi | |
| 4,964,493 A * | 10/1990 | Yamaura et al. | 188/282.6 |
| 4,993,524 A | 2/1991 | Grundei et al. | |
| 5,219,414 A | 6/1993 | Yamaoka | |
| 5,316,113 A * | 5/1994 | Yamaoka | 188/282.6 |
| 5,325,942 A | 7/1994 | Groves et al. | |
| 5,738,190 A * | 4/1998 | Deferme | 188/280 |
| 6,371,264 B1 | 4/2002 | Deferme | |
| 6,422,361 B1 * | 7/2002 | Naples et al. | 188/322.15 |

* cited by examiner

*Primary Examiner*—Robert A. Siconolfi
*Assistant Examiner*—Bradley T. King
(74) *Attorney, Agent, or Firm*—Harness, Dickey & Pierce, PLC

(57) ABSTRACT

A shock absorber includes a rebound valve assembly which performs the flexing disc function normally required for allowing the passage of fluid from one side of a piston assembly to the opposite side during the stroke of the shock absorber. The rebound valve assembly also incorporates a blow off function which increases the fluid flow through the piston when the fluid pressure being exerted upon the rebound valve assembly exceeds a specified level. The blow off feature utilizes a coil spring to protect both the shock absorber as well as the suspension system into which the shock absorber is assembled.

11 Claims, 3 Drawing Sheets

FULCRUM BLOW OFF VALVE FOR USE IN A SHOCK ABSORBER

FIELD OF THE INVENTION

The present invention relates generally to shock absorbers having a unique rebound valve. More particularly, the present invention relates to a shock absorber having a rebound valve defined by a valve assembly that combines both the normal valving for the shock absorber and a blow-off function.

BACKGROUND OF THE INVENTION

Shock absorbers are used in connection with automotive suspension systems and other suspension systems to absorb unwanted vibrations which occur during movement of the suspension system. In order to absorb this unwanted vibration, automotive shock absorbers are generally connected between the sprung mass (the body) and unsprung mass (the suspension) of the automobile.

The most common type of shock absorber in automobiles is the dashpot type in which a piston is located within a pressure tube. The piston is connected to the sprung mass of the vehicle through a piston rod. The piston divides the pressure tube into an upper working chamber and a lower working chamber, both of which are filled with a damping fluid. Because the piston, through valving, has the ability to limit the flow of the damping fluid between the upper and lower working chambers within the pressure tube when the shock absorber is compressed or extended, the shock absorber is able to produce a damping force which counteracts the vibrations which would otherwise be transmitted from the unsprung mass to the sprung mass. In a dual tube shock absorber, a fluid reservoir is defined between the pressure tube and the reserve tube. A base valve is located between the lower working chamber and the fluid reservoir to produce a damping force which also counteracts the vibration which would otherwise be transmitted from the unsprung mass to the sprung mass of the automobile.

Automotive shock absorbers are generally provided with bleed orifices which allow the restricted flow of damping fluid from the upper side of the piston, which is know as the rebound side, to the lower side of the piston, which is known as the compression side. These bleed orifices provide the shock absorber with a portion of its damping characteristic. Automotive shock absorbers also may include a blow off valve of some type. The blow off valve is normally in a closed position. However, when fluid pressure within the pressure cylinder reaches a predetermined level, the blow off valve opens reducing considerably the restriction of damping fluid flow between the two sides of the piston.

Various designs in the prior art combine the conventional piston valving with a blow off valve. For example, U.S. Pat. No. 4,721,130, issued on Jan. 26, 1988 to Hayashi for "Valve Structure of Hydraulic Buffer," discloses a valve structure used in a hydraulic buffer. A valve body is used for opening and closing ports in the piston. As the piston rod is extended, a free end of the valve body deflects about a first fulcrum point to allow fluid to pass. When the piston is moving at a high rate of speed and the force of the fluid passing through the port exceeds the pre-load set by the spring, the spring seat is depressed so that more fluid flows through the port while deflecting the valve body about a second fulcrum point.

Additionally, U.S. Pat. No. 2,717,058, issued to Brundreit on Sep. 6, 1955 for "Shock Absorber Control Valve," discloses a shock absorber control valve for controlling restricted flow of hydraulic fluid between opposite ends of a pressure tube. A valve disk flexes upwardly against a rigid retainer plate as permitted by the angularity of the face portion of the plate. As the requirement for fluid flow increases, the valve member and the retainer are moved against the compression spring to change the fluid flow rate.

While these prior art systems have performed acceptably, they are relatively complex and they fail to produce optimum results in the terms of efficiency and cost. The continued development of shock absorbers includes the development of systems which combine the flexing disk function of a rebound valve with the blow off function in a system that is less complex and less expensive while providing the necessary damping acquirements.

SUMMARY OF THE INVENTION

The present invention provides the art with a shock absorber that includes a flexing disc assembly which combines the flexing disc function of a rebound valve with the blow off function. The shock absorber of the present invention utilizes a flexing disc assembly for allowing the passage of fluid between the two sides of the piston in the pressure tube. The fluid discs are held against the piston body by a coil spring and a valve retainer. The coil spring biases the valve retainer towards the valve discs by reacting against a nut. The nut is threaded onto the end of the piston rod. A spacer limits the travel of the nut thus controlling the amount of coil spring preload while eliminating tolerance build up and over compression of the discs.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
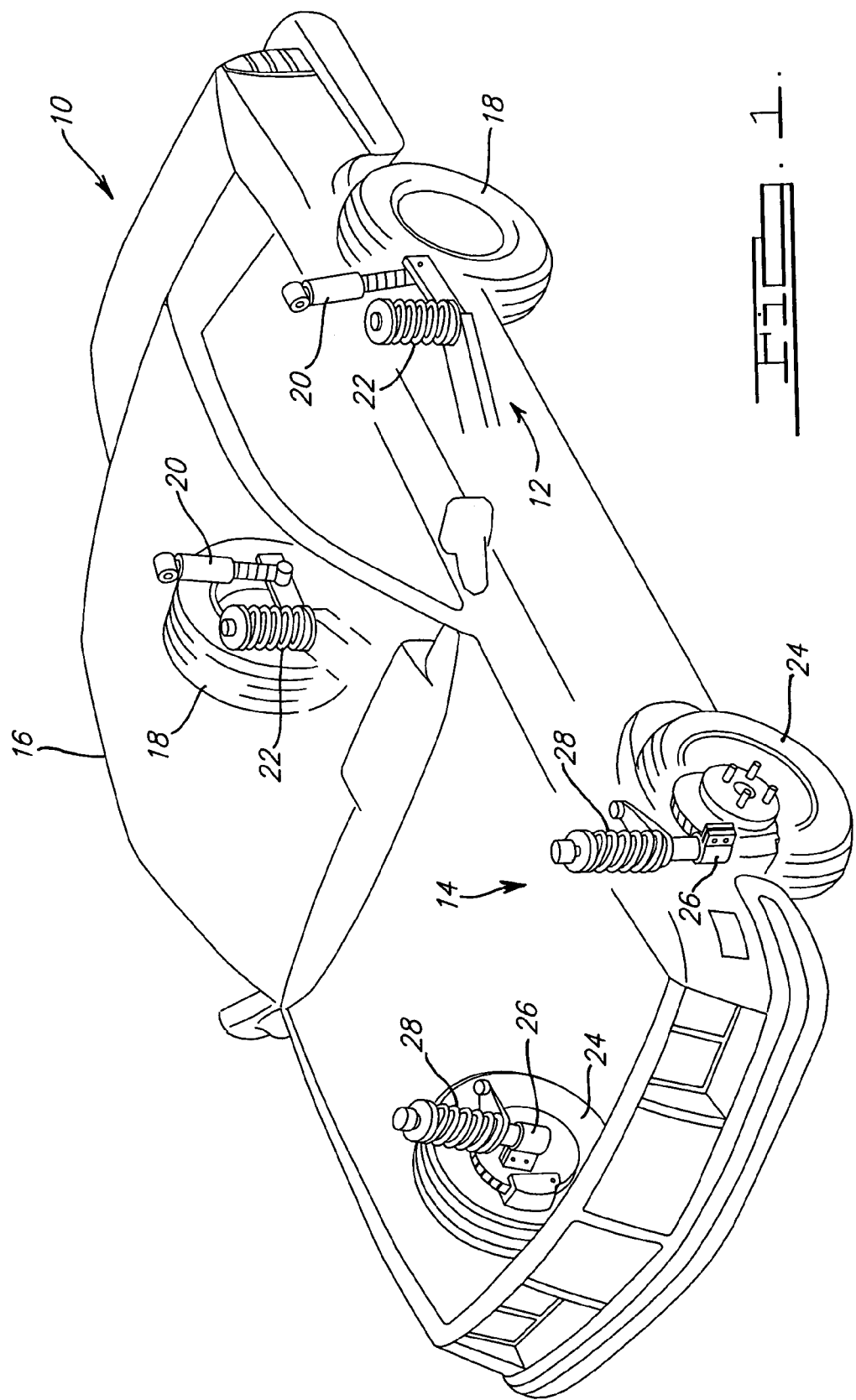
FIG. 1 is a schematic representation of the shock absorber in accordance with the present invention in operative association with a typical automobile.

Referring now to the drawings in which like reference numerals designate like or corresponding parts throughout the several views, there is shown in FIG. 1 a vehicle incorporating a suspension system having the shock absorbers in accordance with the present invention which is designated generally by the reference numeral 10. Vehicle 10 includes a rear suspension 12, a front suspension 14 and a body 16. Rear suspension 12 has a transversely extending rear axle assembly (not shown) adapted to operatively support the vehicle's rear wheels 18. The rear axle assembly is operatively connected to body 16 by means of a pair of shock absorbers 20 and a pair of helical coil springs 22. Similarly, front suspension 14 includes a transversely extending front axle assembly (not shown) to operatively support the vehicle's front wheels 24. The front axle assembly is operatively connected to body 16 by means of a second pair of shock absorbers 26 and by a second pair of helical coil springs 28. Shock absorbers 20 and 26 serve to dampen the relative motion of the unsprung portion (i.e. front and rear suspensions 12 and 14, respectively) and the sprung portion (i.e. body 16) of vehicle 10. While vehicle 10 has been depicted as a passenger car having front and rear axle assemblies, shock absorbers 20 and 26 may be used with other types of vehicles or in other types of applications such as vehicles incorporating independent front and/or independent rear suspension systems. Further, the term "shock absorber" as used herein is meant to refer to dampers in general and thus will include MacPherson struts.

Figure 2:
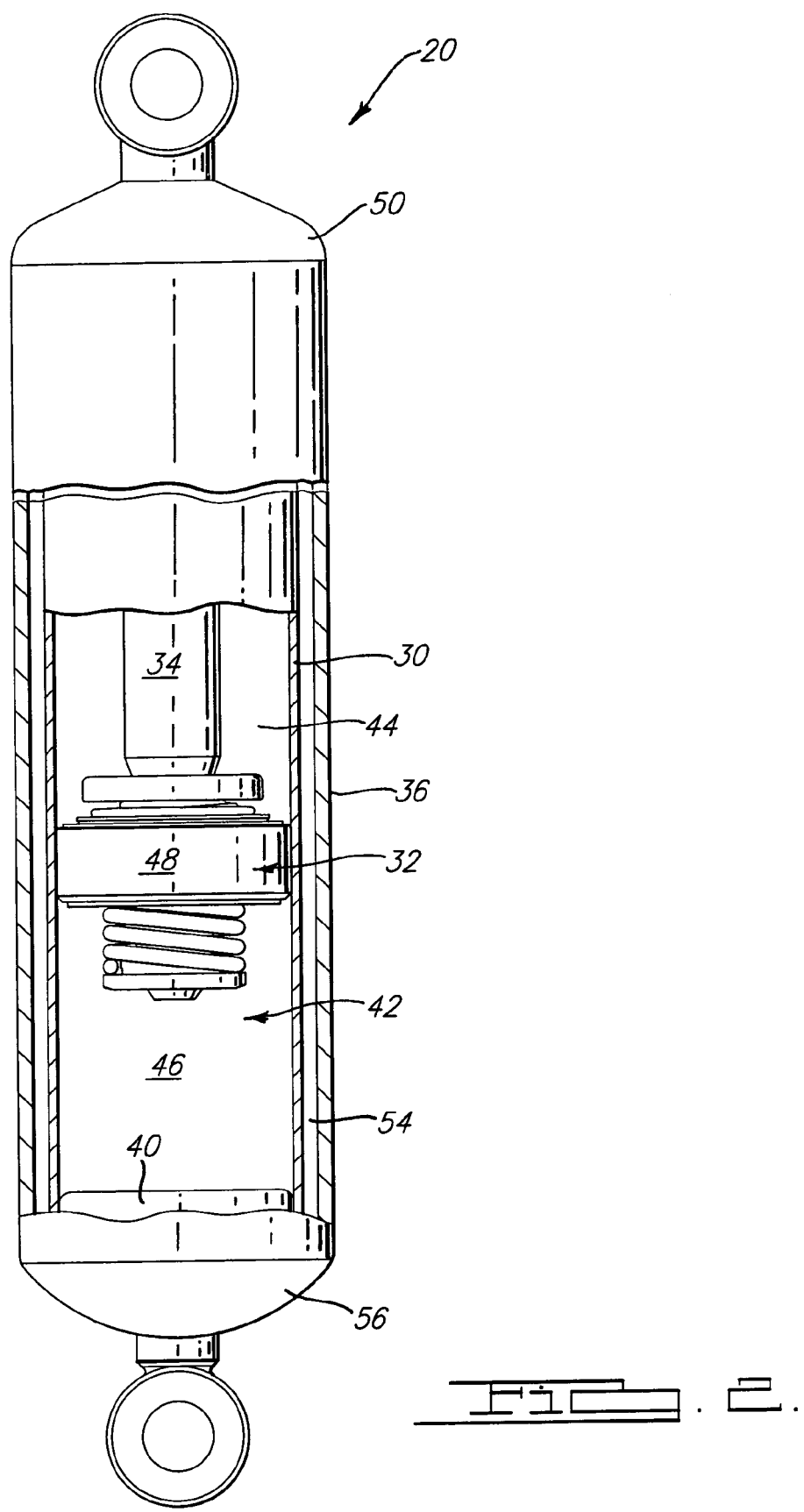
FIG. 2 is a cross-sectional view of the shock absorber in accordance with the present invention.

Referring now to FIG. 2, shock absorber 20 is shown in greater detail. While FIG. 2 shows only shock absorber 20, it is to be understood that shock absorber 26 also includes the piston assembly described below for shock absorber 20. Shock absorber 26 only differs from shock absorber 20 in the way in which it is adapted to be connected to the sprung and unsprung portions of vehicle 10. Shock absorber 20 comprises a pressure tube 30, a piston assembly 32, a piston rod 34, a reservoir tube 36 and a base valve assembly 40.

Pressure tube 30 defines a working chamber 42. Piston assembly 32 is slidably disposed within pressure tube 30 and divides working chamber 42 into an upper working chamber 44 and a lower working chamber 46. A seal 48 is disposed between piston assembly 32 and pressure tube 30 to permit sliding movement of piston assembly 32 with respect to pressure tube 30 without generating undue frictional forces as well as sealing upper working chamber 44 from lower working chamber 46. Piston rod 34 is attached to piston assembly 32 and extends through upper working chamber 44 and through an end cap 50 which closes the upper end of pressure tube 30. A sealing system seals the interface between upper end cap 50, reserve tube 36 and piston rod 34. The end of piston rod 34 opposite to piston assembly 32 is adapted to be secured to the sprung portion of vehicle 10. Valving within piston assembly 32 controls the movement of fluid between upper working chamber 44 and lower working chamber 46 during movement of piston assembly 32 within pressure tube 30. Because piston rod 34 extends only through upper working chamber 44 and not lower working chamber 46, movement of piston assembly 32 with respect to pressure tube 30 causes a difference in the amount of fluid displaced in upper working chamber 44 than the amount of fluid displaced in lower working chamber 46. The difference in the amount of fluid displaced is known as the "rod volume" and it flows through base valve assembly 40.

Reservoir tube 36 surrounds pressure tube 30 to define a reservoir chamber 54 located between the tubes. The bottom end of reservoir tube 36 is closed by an end cap 56 which is adapted to be connected to the unsprung portion of vehicle 10. The upper end of reservoir tube 36 is attached to upper end cap 50. Base valve assembly 40 is disposed between lower working chamber 46 and reservoir chamber 54 to control the flow of fluid between the two chambers. When shock absorber 20 extends in length, an additional volume of fluid is needed in lower working chamber 46 due to the "rod volume" concept. Thus, fluid will flow from reservoir chamber 54 to lower working chamber 46 through base valve assembly 40. When shock absorber 20 compresses in length, an excess amount of fluid must be removed from lower working chamber 46 due to the "rod volume" concept. Thus, fluid will flow from lower working chamber 46 to reservoir chamber 54 through base valve assembly 40.

Figure 3:
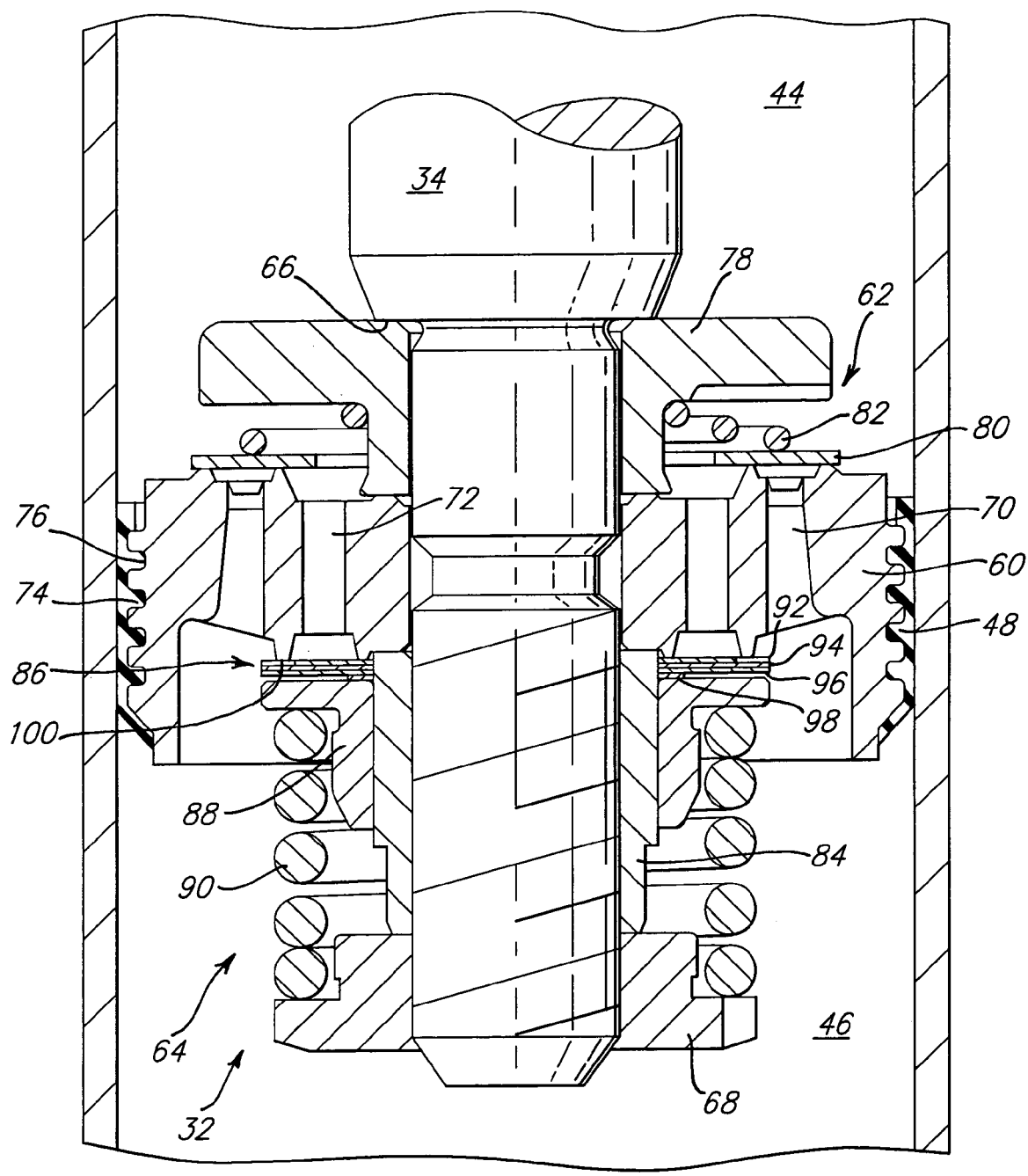
FIG. 3 is an enlarged cross-sectional view of the piston assembly in accordance with the present invention.

Referring now to FIG. 3, piston assembly 32 comprises a piston body 60, a compression valve assembly 62 and a rebound valve assembly 64. Compression valve assembly 62 is assembled against a shoulder 66 on piston rod 34. Piston body 60 is assembled against compression valve assembly 62 and rebound valve assembly 64 is assembled against piston body 60. A nut 68 secures these components to piston rod 34.

Piston body 60 defines a plurality of compression passages 70 and a plurality of rebound passages 72. Seal 48 includes a plurality of ribs 74 which mate with a plurality of annular grooves 76 to permit sliding movement of piston assembly 32.

Compression valve assembly 62 comprises a retainer 78, a valve disc 80 and a spring 82. Retainer 78 abuts shoulder 66 on one end and piston body 60 on the other end. Valve disc 80 abuts piston body 60 and closes compression passages 70 while leaving rebound passages 72 open. Spring 82 is disposed between retainer 78 and valve disc 80 to bias valve disc 80 against piston body 60. During a compression stroke, fluid in lower working chamber 46 is pressurized causing fluid pressure to react against valve disc 80. When the fluid pressure against valve disc 80 overcomes the biasing load of spring 82, valve disc 80 separates from piston body 60 to open compression passages 70 and allow fluid flow from lower working chamber 46 to upper working chamber 44. In a single-tube shock absorber, the strength of spring 82 and the size of compression passages 70 will determine the damping characteristics for shock absorber 20 in compression. In a dual-tube shock absorber as shown in FIG. 2, compression valve assembly 62 is designed as a low load check valve and the damping characteristics for shock absorber 20 in compression is controlled by the design of base valve assembly 40. During a rebound stroke, compression passages 70 are closed by valve disc 80 while fluid is allowed to flow into rebound passages 72.

Rebound valve assembly 64 comprises a spacer 84, a plurality of valve discs 86, a spring retainer 88 and a coil spring 90. Spacer 84 is threadingly or slidingly received on piston rod 34 and is disposed between piston body 60 and nut 68. Spacer 84 retains piston body 60 and compression valve assembly 62 while permitting the tightening of nut 68 without compressing either valve disc 80 or the plurality of valve discs 86. Spring retainer 78, piston body 60 and spacer 84 provide a continuous solid connection between shoulder 66 and nut 68 to facilitate the tightening and securing of nut 68 to piston rod 34 as well as determining the working height for coil spring 90. The plurality of valve discs 86 are slidingly received on spacer 84 and abut piston body 60 to close rebound passages 72 while leaving compression passages 70 open. Retainer 88 is also slidingly received on spacer 84 and abuts the plurality of valve discs 86. Coil spring 90 is assembled over spacer 84 and over spring retainer 88 to provide stability for coil spring 90. Coil spring 90 is disposed between spring retainer 88 and nut 68. Coil spring 90 biases spring retainer 88 against the plurality of valve discs 86 and the plurality of valve discs 86 against piston body 60. The plurality of valve discs 86 comprise a bleed disc 92, a valve disc 94, a spacer disc 96 and a fulcrum disc 98. Bleed disc 92, valve disc 94 and spacer disc 96 all have the same outer diameter. Bleed disc 92 includes a plurality of slots 100 which permit a limited amount of bleed flow bypassing rebound valve assembly 64. Fulcrum disc 98 provides a fulcrum point or bending point for bleed disc 92, valve disc 94 and spacer disc 96. When fluid pressure is applied to discs 92, 94 and 96, they will elastically deflect at the outer peripheral edge of fulcrum disc 98 to open rebound valve assembly 64. The calibration for the blow off feature of rebound valve assembly 64 is separate from compression valve assembly 62 and it is controlled by the design of spacer 84 and nut 68. Further calibration of the blow off feature can be accomplished by placing one or more shims (not shown) between nut 68 and spacer 84 as illustrated in Assignee's U.S. Pat. No. 6,371,264, the disclosure of which is incorporated herein by reference.

During a rebound stroke, fluid in upper working chamber 44 is pressurized causing fluid pressure to react against the plurality of valve discs 86. When the fluid pressure against the plurality of valve discs 86 overcomes the bending load for the plurality of valve discs 86, the plurality of valve discs 86 elastically deflects opening rebound passages 72 allowing fluid flow from upper working chamber 44 to lower working chamber 46. The strength of the plurality of valve discs 86 and the size of rebound passages 72 will determine the damping characteristics for shock absorber 20 in rebound. If the fluid pressure within upper working chamber 44 reaches a predetermined level, the fluid pressure will overcome the biasing load of coil spring 90 causing the axial movement of spring retainer 88 and the plurality of valve discs 86. The axial movement of spring retainer 88 and the plurality of valve discs 86 fully open rebound passages 72 thus allowing the passage of a significant amount of damping fluid creating a blowing off of the fluid pressure which is required to prevent damage to shock absorber 20 and/or the vehicle.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A shock absorber comprising:
   a pressure tube forming a working chamber;
   a piston body slidably disposed within said working chamber, said piston body dividing said working chamber into an upper working chamber and a lower working chamber, said piston body defining a rebound passage extending through said piston body in communication with said upper working chamber;
   a piston rod attached to said piston body, said piston rod extending in an axial direction through one end of said pressure tube;
   a rebound valve assembly attached to said piston rod abutting said piston body, said rebound valve assembly comprising:
      a spacer slidingly received in the axial direction on said piston rod abutting said piston body;
      a nut threadingly received on said piston rod, abutting said spacer to urge said spacer in the axial direction into engagement with said piston body;
      a bleed disc disposed between said piston body and said nut, said bleed disc abutting said piston body to close said rebound passage;
      said bleed disc defining a slot extending directly between said lower working chamber and said rebound passage to define a continuously open bleed flow bypass between said upper and lower working chambers;
      a fulcrum disc disposed between said bleed disc and said nut, said fulcrum disc being smaller in diameter than said bleed disc to define a fulcrum point for said bleed disc;
      a spring retainer disposed between said fulcrum disc and said nut, said spring retainer being slidingly received over said spacer; and
      a coil spring disposed between said rebound retainer and said nut, said coil spring having a working height which produces a biasing load urging said bleed disc towards said piston body, said working height being defined by said spacer, said spring retainer being disposed within said coil spring to provide stability for said coil spring.

2. The shock absorber according to claim 1 further comprising a compression valve assembly attached to said piston rod.

3. The shock absorber according to claim 2 wherein said piston body defines a compression passage extending through said piston body and wherein said compression valve assembly comprises:
   a compression retainer disposed between said piston body and a shoulder defined by said piston rod;
   a compression valve disc disposed between said compression retainer and said piston body, said compression valve disc closing said compression passage; and
   a compression spring disposed between said compression retainer and said compression valve disc, said compression spring urging said compression valve disc towards said piston body.

4. The shock absorber according to claim 3 wherein said compression spring is a coil spring.

5. A shock absorber comprising:
   a pressure tube forming a working chamber;
   a piston rod extending in an axial direction through one end of said pressure tube, said piston rod defining a shoulder and a threaded end;
   a compression retainer attached to said piston rod abutting said shoulder;
   a piston body attached to said piston rod abutting said compression retainer, said piston body dividing said working chamber into an upper working chamber and a lower working chamber;
   a rebound spacer slidingly received in the axial direction on said piston rod abutting said piston body;
   a nut threadingly received on said threaded end of said piston rod, said nut abutting said rebound spacer to urge said rebound spacer in the axial direction into engagement with said piston body;
   a rebound passage extending through said piston body, said rebound passage being in communication with said upper working chamber;
   a bleed disc slidingly received on said rebound spacer, said bleed disc being disposed between said piston body and said nut, said bleed disc abutting said piston body to close said rebound passage, and said bleed disc defining a slot extending directly between said lower working chamber and said rebound passage to define a continuously open bleed flow bypass between said upper and lower working chamber;
   a spring retainer slidingly received on said rebound spacer, said spring retainer being disposed between said bleed disc and said nut;
   a coil spring disposed between said spring retainer and said nut, said coil spring having a working height which produces a biasing load to bias said bleed disc towards said piston body, said working height being defined by said spacer, said spring retainer being disposed within said coil spring to provide stability for said coil spring.

6. The shock absorber according to claim 5 further comprising:
   a compression passage extending through said piston body;
   a compression valve disc disposed between said compression retainer and said piston body to close said compression passage;
   a compression spring disposed between said compression valve disc and said compression retainer, said compression spring urging said compression valve disc towards said piston body.

7. The shock absorber according to claim 6 wherein said compression spring is a coil spring.

8. The shock absorber according to claim 5 further comprising a fulcrum disc disposed between said bleed disc and said spring retainer.

9. The shock absorber according to claim 8 wherein said bleed disc and said fulcrum disc are slidingly received over said spacer.

10. The shock absorber according to claim 8 further comprising a valve disc disposed between said bleed disc and said fulcrum disc, said bleed disc and said valve disc having the same outer diameter.

11. The shock absorber according to claim 10 further comprising a spacer disc disposed between said valve disc and said fulcrum disc, said bleed disc and said spacer disc having the same outer diameter.

* * * * *